United States Patent
Banno et al.

(10) Patent No.: US 7,409,278 B2
(45) Date of Patent: Aug. 5, 2008

(54) ANTI-ROLLOVER DEVICE FOR VEHICLE

(75) Inventors: Masaki Banno, Nagoya (JP); Hiroshi Matsuoka, Toyota (JP); Shinichi Tagawa, Kariya (JP)

(73) Assignee: Advics Co., Ltd., Aichi-Pref. (JP)

( * ) Notice: Subject to any disclaimer, the term of this patent is extended or adjusted under 35 U.S.C. 154(b) by 651 days.

(21) Appl. No.: 10/878,566

(22) Filed: Jun. 29, 2004

(65) Prior Publication Data

US 2005/0015191 A1   Jan. 20, 2005

(30) Foreign Application Priority Data

Jul. 17, 2003   (JP)   ............... 2003-276063

(51) Int. Cl.
*G06F 19/00* (2006.01)
(52) U.S. Cl. .............. 701/70; 701/38; 340/440
(58) Field of Classification Search ............. 701/70, 701/73, 80, 36–38; 307/9.1, 10.1; 340/438, 340/440; 280/5.502, 5.506, 5.507, 5.5
See application file for complete search history.

(56) References Cited

U.S. PATENT DOCUMENTS

| 6,253,123 B1 | 6/2001 | Schramm et al. |
| 2002/0005307 A1 | 1/2002 | Irie et al. |
| 2004/0254703 A1 | 12/2004 | Traechtler et al. |

FOREIGN PATENT DOCUMENTS

| JP | A-58-192942 | 11/1983 |
| JP | A-6-299881 | 10/1994 |
| JP | A-11-59366 | 3/1999 |
| JP | A-11-254992 | 9/1999 |
| JP | A-11-258260 | 9/1999 |
| JP | A-2001-105927 | 4/2001 |
| JP | A2005036750 | * 2/2005 |

OTHER PUBLICATIONS

Notification of Reasons for Rejection from the Japanese Patent Office for corresponding Japanese patent application No. 2003-276063 mailed on Jan. 8, 2008.
Official Letter from German Patent Office issued on Oct. 23, 2006 for the corresponding German patent application No. 10 2004 033 861. 2-21 (a copy and English translation/comments thereof).

* cited by examiner

*Primary Examiner*—Yonel Beaulieu
(74) *Attorney, Agent, or Firm*—Posz Law Group, PLC

(57) ABSTRACT

A road surface friction coefficient $\mu$ is calculated based on a detected lateral acceleration and a front-rear acceleration, and a roll angle is calculated using a roll rate. Further, a maximum engine torque value that can be applied to a drive wheel without causing slipping thereof is calculated based on the road surface friction coefficient $\mu$ and a gear ratio. A torque transmission rate that indicates a reduction rate for engine output is set so as to reduce in accordance with a roll angle, and a target engine torque value is calculated by correcting the maximum engine torque value using the torque transmission rate. Accordingly, adjustment is executed such that the engine output is made smaller as the roll angle increases. Thus, abrupt changes in vehicle behavior are not caused by sudden starting of control, and it is possible to inhibit drive feeling from deteriorating.

14 Claims, 8 Drawing Sheets

ANTI-ROLLOVER DEVICE FOR VEHICLE

CROSS REFERENCE TO RELATED APPLICATION

This application is based upon and claims the benefit of Japanese Patent Application No. 2003-276063 filed on Jul. 17, 2003, the content of which are incorporated herein by reference.

FIELD OF THE INVENTION

The present invention relates to a vehicle anti-rollover device that inhibits rollover from occurring when a vehicle is turning.

BACKGROUND OF THE INVENTION

Related art has been disclosed (for example, see Japanese Patent Application Laid-Open No. 11-254992) that aims to inhibit rollover of a vehicle by reducing a lateral acceleration thereof. In the case that there is an indication that rollover may occur, namely, a rollover tendency, when a vehicle is turning sharply, the lateral acceleration is reduced by causing vehicle speed to be slowed by executing automatic reduction of engine output and applying a brake.

With this related art, it is determined whether the vehicle has a rollover tendency based on whether or not (1) a wheel speed of a drive wheel that is positioned at the inside of a turn direction of the vehicle is greater than a predetermined value, or (2) an acceleration of this drive wheel is greater than a predetermined value. When it is determined that the vehicle has the rollover tendency, namely, that the wheel speed of the drive wheel at the inside of the turn direction, or the acceleration thereof, exceeds the predetermined value, engine output is reduced and the brake is applied.

However, with this related art, reduction of engine output and application of the brake is not executed unless the wheel speed of the drive wheel at the inside of the turn direction, or the acceleration thereof, exceeds the predetermined value. Accordingly, reduction of engine output and application of the brake is executed suddenly at the point when the wheel speed or acceleration thereof has increased enough to exceed the threshold value. Thus, control of vehicle speed change and lateral acceleration change is started abruptly, which causes vehicle posture to change substantially, thus having a detrimental impact on driving feeling.

SUMMARY OF THE INVENTION

It is an object of the present invention to inhibit deterioration in driving feeling caused by abrupt start-up of control when rollover of a vehicle is inhibited during turning, and to inhibit the vehicle from entering a state in which it is liable to rollover.

According to a first aspect of the present invention, a torque transmission rate for correcting a target engine torque value that is a target value for engine output to a smaller value is set so as to become smaller in accordance with a physical quantity that indicates a change in vehicle posture in a lateral direction of a vehicle. In other words, the torque transmission rate is set to become smaller in accordance with increase in a magnitude of a vehicle posture change physical quantity. More specifically, the engine output is corrected such that a target engine torque value becomes smaller as change of the vehicle posture in the lateral direction increases; or, alternatively, a torque value that is removed from the target engine torque value is increased as the vehicle posture change in the lateral direction increases.

Accordingly, the engine output is reduced in accordance with the extent to which the vehicle posture changes in the lateral direction, whereby it is possible to inhibit the occurrence of vehicle rollover. Thus, since engine output control is not started up abruptly, driving feeling is not impaired by the generation of abnormal changes in vehicle posture.

With this configuration, it is possible to set the target engine torque value that is subject to correction using the torque transmission rate to the maximum engine torque value that it is possible for a drive wheel to transmit to a road surface without slip of the drive wheel taking place. Thus, it is possible to inhibit vehicle rollover from occurring without restricting engine output to an excessively low level.

Note that, the maximum engine torque value is, for example, calculated based on a road surface friction coefficient and a transmission gear ratio. The road surface friction coefficient used in this case is calculated based on an acceleration of the vehicle.

According to a second aspect of the present invention, correction is executed such that the target engine torque value is set to a smaller value by a torque transmission rate, which is calculated in accordance with a magnitude of a roll angle. In other words, correction is executed such that a torque reduction amount that is removed from the target engine torque value becomes larger.

Accordingly, adjustment is executed such that a magnitude of the engine output becomes smaller in accordance with increase in the magnitude of the roll angle of the vehicle. Accordingly, sudden changes in vehicle posture are not caused to occur when vehicle rollover is being inhibited.

According to a third aspect of the present invention, when the torque transmission rate increases (namely, when the posture of the vehicle changes in a direction in which the roll angle becomes smaller, this roll angle indicating vehicle posture change in the lateral direction of the vehicle), an increase amount of the torque transmission rate is reduced to a torque recovery value that is a comparatively small value.

Thus, it is possible to inhibit the torque transmission rate from increasing abruptly, whereby sudden increase of the target engine torque value is also inhibited. Accordingly, it is possible to inhibit abrupt changes in vehicle posture from occurring.

The torque recovery value mentioned here is set, for example, to become a larger value in accordance with increase in a magnitude of a roll rate in a direction in which the roll angle decreases. Accordingly, the increase amount of the target engine torque value that is corrected to become smaller is increased as the roll rate in the direction in which the roll angle decreases (namely, as a reduction speed of the roll angle increases). Thus, it is possible to return to the pre-correction value for the target engine torque value earlier, whereby driving feeling is improved.

According to a fourth aspect of the present invention, correction is executed such that a target engine torque value is set to a low value by the torque transmission rate that is calculated in accordance with the magnitude of the roll rate. In other words, correction is executed such that the torque reduction amount that is removed from the target engine torque value is increased.

Therefore, adjustment is executed such that the magnitude of the engine output becomes smaller in accordance with increase in the magnitude of the roll rate of the vehicle. Accordingly, sudden changes in vehicle posture are not caused to occur when vehicle rollover is being inhibited.

According to a fifth aspect of the present invention, when the torque transmission rate increases (namely, when the posture of the vehicle changes in a direction in which the roll rate becomes smaller, this roll rate indicating vehicle posture change in the lateral direction of the vehicle), the increase amount of the torque transmission rate is reduced to a torque recovery value that is a comparatively small value.

Thus, it is possible to inhibit the torque transmission rate from increasing abruptly, whereby sudden increase of the target engine torque value is also inhibited. Accordingly, it is possible to inhibit abrupt changes in vehicle posture from occurring.

According to a sixth embodiment of the present invention, correction is executed such that a target engine torque value is set to a low value by a torque transmission rate that is calculated in accordance with a magnitude of lateral acceleration. In other words, correction is executed such that the torque reduction amount that is removed from the target engine torque value is increased.

Therefore, adjustment is executed such that the magnitude of the engine output becomes smaller in accordance with increase in the magnitude of the lateral acceleration of the vehicle. Accordingly, sudden changes in vehicle posture are not caused to occur when vehicle rollover is being inhibited.

Moreover, in this case, if a steering angular velocity is larger than a predetermined value, it is possible to calculate the torque transmission rate in accordance with a lateral acceleration value that is calculated based on a detection value of a yaw rate sensor. Thus, if the steering angular velocity is larger than the predetermined value (namely, if the steering wheel is being turned rapidly), the torque transmission rate is calculated based on the lateral acceleration value calculated in accordance with the yaw rate that is the detection value of the yaw rate sensor, instead of using a detection value of a lateral acceleration sensor. The yaw rate obtained by the yaw rate sensor is more responsive than the lateral acceleration obtained by the lateral acceleration sensor. Accordingly, the lateral acceleration calculated in accordance with the yaw rate is highly responsive to rapid turning of the steering wheel. Thus, it is possible to calculate the torque transmission rate with a high degree of responsiveness.

According to a seventh aspect of the present invention, when the torque transmission rate increases (namely, when the posture of the vehicle changes in a direction in which the lateral acceleration becomes smaller, this lateral acceleration indicating vehicle posture change in the lateral direction of the vehicle), an increase amount of the torque transmission rate is reduced to a torque recovery value that is a comparatively small value. Thus, it is possible to inhibit the torque transmission rate from increasing abruptly, whereby sudden increase of the target engine torque value is also inhibited. Accordingly, it is possible to inhibit abrupt changes in vehicle posture from occurring.

In this case, the torque recovery value is set, for example, to become a larger value in accordance with increase in a magnitude of a lateral acceleration change amount in a direction in which the lateral acceleration decreases. Accordingly, the increase amount of the target engine torque value that is corrected to become smaller is increased as the lateral acceleration change amount in the direction that reduces the lateral acceleration increases (namely, as a reduction speed of the lateral acceleration increases). Thus, it is possible to return to the pre-correction value for the target engine torque value earlier, whereby driving feeling is improved.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
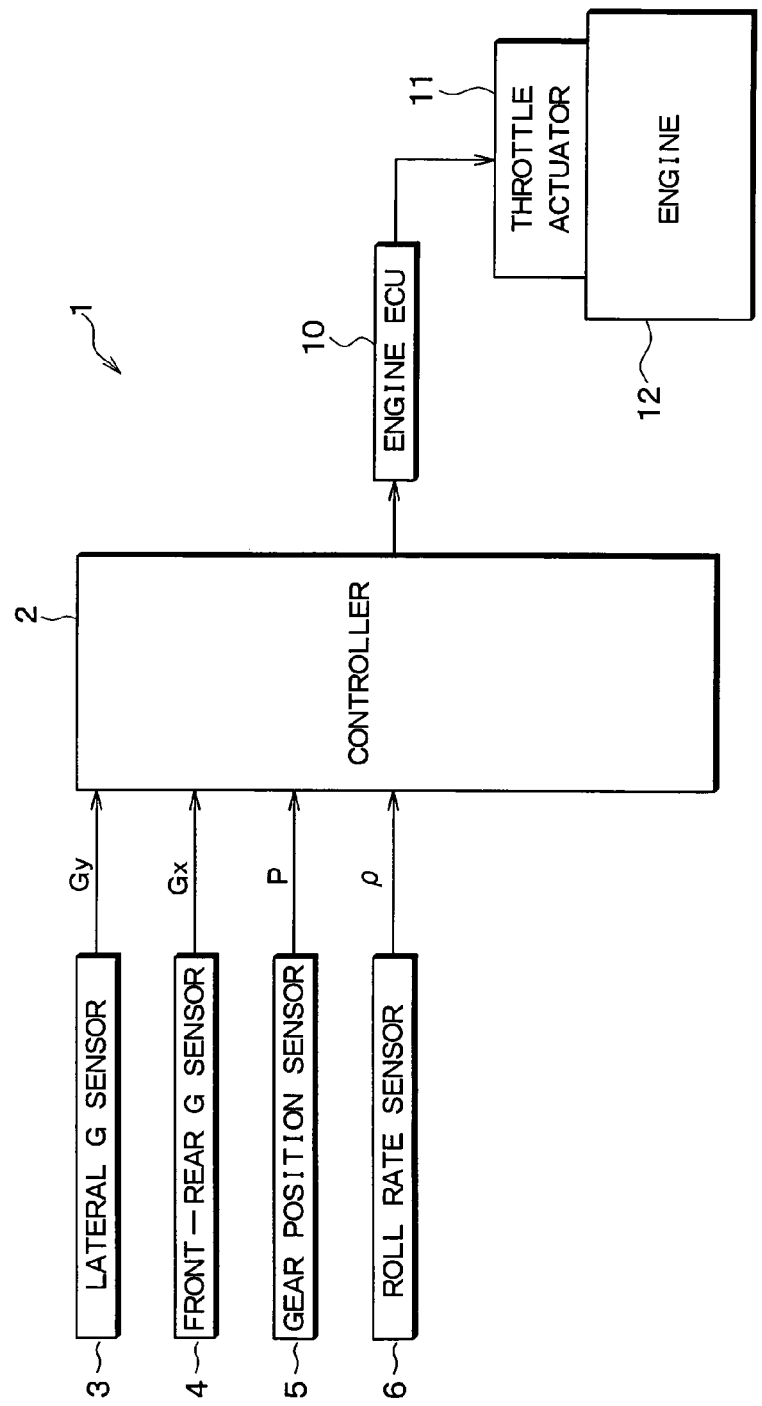
FIG. 1 is a block diagram that schematically shows the configuration of an anti-rollover device for a vehicle according to a first embodiment of the present invention.

The present invention will be described further with reference to various embodiments in the drawings.

First Embodiment

Hereinafter, an embodiment of the present invention will be described with reference to the drawings. FIG. 1 is a block diagram that schematically shows the configuration of an anti-rollover device 1 for a vehicle according to a first embodiment of the present invention. The anti-rollover device 1 according to the first embodiment is provided with a controller 2 that is configured by a micro-computer.

The anti-rollover device 1 includes a lateral acceleration (lateral G) sensor 3, a front-rear acceleration (front-rear G) sensor 4, a gear position sensor 5, and a roll rate sensor 6. The lateral G sensor 3 detects an acceleration value Gy that acts on a vehicle body in a lateral direction thereof (hereinafter referred to as "lateral G value Gy"). Note that the direction to the left of the vehicle (hereinafter referred-to as the "left direction") when it is travelling forward is taken as positive for the lateral G value Gy. The front-rear G sensor 4 detects an acceleration valve Gx that acts on the vehicle body in a front-rear direction thereof (hereinafter referred to as "front-rear G value Gx"). The gear position sensor 5 detects a state of a gear ratio P of a transmission (not shown). The roll rate sensor 6 detects an angular velocity around a roll axis of the vehicle body, namely, a roll rate ρ that is a roll angular velocity. It should be noted that the left direction (the counter-clockwise direction) when the vehicle is travelling forward is taken as positive for the roll rate ρ, and the direction to the right (the clockwise direction; hereinafter referred to as the "right direction") is taken as negative.

The lateral G sensor 3, the front-rear G sensor 4, the gear position sensor 5, and the roll rate sensor 6 are connected to the controller 2. Respective detection signals from the sensors 3, 4, 5 and 7 are output to the controller 2, and are signal processed thereby. While a control program (described later) of the controller 2 is being executed, the respective detection signals are utilized as respective sensor detection values.

Note that, according to the first embodiment, the lateral G and the roll rate correspond to a vehicle posture change physical quantity, and the lateral G sensor 3, the roll rate sensor 6 and the controller 2 correspond to a vehicle posture change physical quantity detection unit.

The anti-rollover device 1 includes an engine control device (hereinafter referred to as an engine ECU) 10, and a throttle actuator 11. The engine ECU 10 is connected to the controller 2, and is also connected to the throttle actuator 11. The engine ECU 10 receives a target engine torque value that is calculated based on the control program (described later), and changes a control signal for the throttle actuator 11. The throttle actuator 11 opens and closes a throttle value (not shown) in accordance with the control signal received from the engine ECU 10, and controls an output torque of an engine 12 so that it becomes equal to the target engine torque value.

Figure 2:
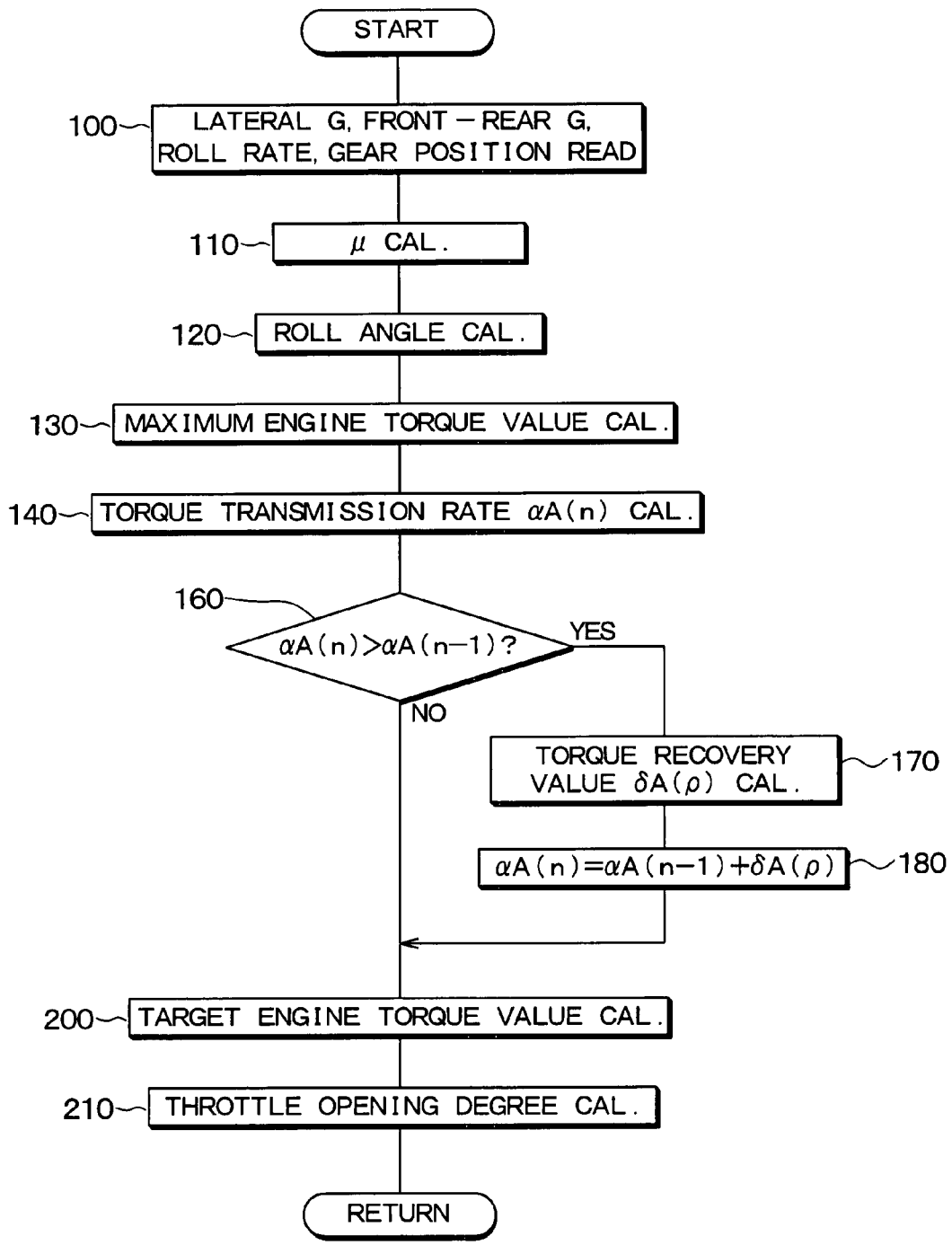
FIG. 2 is a flow chart showing a processing routine of a control program that is executed by a controller of the first embodiment of the present invention.

Next, the operation of the anti-rollover device 1 according to the first embodiment will be explained. FIG. 2 is a flow chart showing a processing routine -of the control program that is executed by the controller 2. This processing is started when an ignition switch is turned on, and is repeated at predetermined time (operation period) intervals.

As can be seen from FIG. 2, at 100, the lateral G value Gy from the lateral G sensor 3, the front-rear G value Gx from the front-rear G sensor 4, the roll rate ρ from the roll rate sensor 6, and the gear ratio P of the transmission from the gear position sensor 5 are respectively read.

Next, the routine proceeds, and, at 110, a road surface friction coefficient (μ) is estimated by calculation based on the read front-rear G value Gx and lateral G value Gy. The road surface friction coefficient is calculated using Equation 1 below. This corresponds to detecting the road surface friction coefficient μ as a value that is equal to the route of the square of the lateral G value Gy added to the square of the front-rear G value Gx.

$$\mu = (Gx^2 + Gy^2)^{1/2}$$ EQUATION 1

Then, at 120, the roll angle φ (deg) is calculated by integrating the read roll rate ρ (deg/sec) by each predetermined time. Accordingly, for example, if a positive roll rate ρ (P>0) is obtained continuously, then the roll angle φ>0, namely, it is indicated that the roll angle of the vehicle body is toward the left direction. Moreover, if, while the roll angle φ has become φ<0, the roll rate ρ changes such that the roll rate becomes ρ>0, the roll angle φ is increasing toward the positive side, namely, it is indicated that the negative roll angle φ is returning to 0.

Next, at 130, a maximum engine torque value MQ is calculated using Equation 2 below. This maximum engine torque value MQ is the maximum engine torque that can be applied to the drive wheel without causing slip thereof, given the state of the road surface that the vehicle is presently on. In other words, when engine output is substantially equal to the maximum engine torque value MQ, the vehicle is able to apply maximum possible driving force to the road surface while maintaining wheel grip.

$$MQ = W \times \mu \times r / P$$ EQUATION 2 where, W is a pre-set drive wheel axial weight; r is a tire radius; and P is the read gear ratio of the transmission. The maximum engine torque value MQ is taken as the target engine torque value prior to correction (hereinafter referred to as the pre-correction target engine torque value).

Accordingly, by taking the maximum engine torque value MQ as the pre-correction target engine torque value, it becomes possible to inhibit rollover of the vehicle without excessively reducing engine output to a low level.

Next, the routine proceeds, and, at 140, a torque transmission rate αA for correcting the target engine torque value so that it becomes smaller in accordance with the roll angle φ is calculated. This torque transmission rate αA is obtained for each operation period as αA (n) for operation performance no. n. Further, the torque transmission rate αA is calculated based on (1) the pre-stored map shown in FIG. 3, described hereinafter; and (2) the roll angle φ calculated at 120 for a given operation performance no. n.

Figure 3:
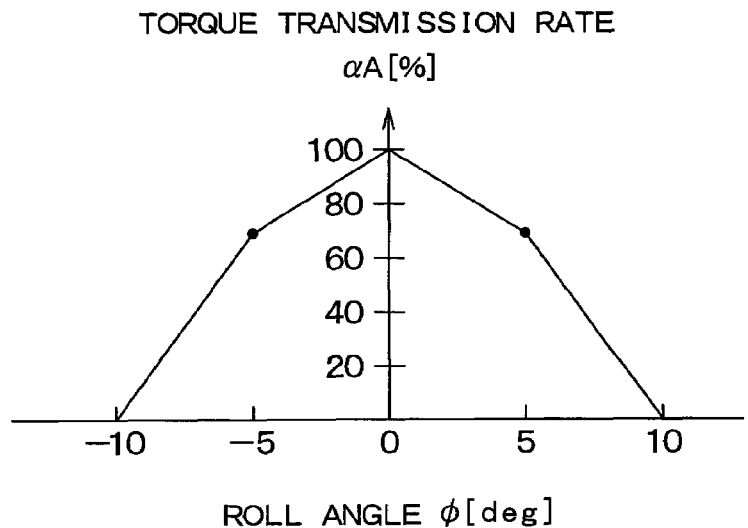
FIG. 3 is a map showing the characteristics of a torque transmission rate αA with respect to a roll angle φ.

As shown in FIG. 3, the torque transmission rate αA is 100% when the roll angle φ is 0, and is set so as to reduce gradually along with increase in the magnitude of the roll angle φ in either the left or right directions. Accordingly, when the torque transmission rate αA is 100%, the target engine torque value is not reduced, namely, the maximum engine torque value MQ is not corrected; and when the torque transmission rate αA equals a %, the target engine torque value (i.e., engine output) is reduced by (100−a) % as far as a %. Thus, as an absolute value |φ| of the roll angle φ increases, the torque transmission rate αA becomes smaller, namely, there is an increase in the rate at which engine output is reduced. Accordingly, engine output is gradually reduced.

At 160, it is determined whether the torque transmission rate αA (n) that is calculated this time (hereinafter referred to as "present torque transmission rate αA") is larger than the previously calculated torque transmission rate αA (n−1) (hereinafter referred to as "prior torque transmission rate αA). If the determination result is NO, the routine proceeds to processing at 200 without changing the prior torque transmission rate αA.

If the determination result is YES, namely, the present torque transmission rate αA (n) is larger than the prior torque transmission rate αA (n−1), this indicates that the absolute value for the roll angle φ this time has become smaller than the absolute value for the previous roll angle φ. In this case, the roll angle φ is in a reducing state. If engine output is substantially increased while the roll angle φ is in this reducing state using the present torque transmission rate αA, which is larger than the previous one, it is possible that sudden changes in vehicle posture will occur. Thus, in this case, in order to gradually restore engine torque (i.e., in order to prevent the prior torque transmission rate αA (n−1), which is comparatively small, from increasing substantially), the routine proceeds to processing at 170.

At 170, the torque recovery value δA (ρ) is calculated. This torque recovery value δA (ρ) is a correction value for the torque transmission rate αA, and is calculated based on the map shown in FIG. 4 and the roll rate ρ at the present time.

Note that, the relationship of the roll rate ρ and the roll angle φ that is the integral value thereof (or, alternatively, the roll angle φ and the roll rate ρ that is the derivative thereof) is as follows. If the roll rate ρ is a negative value (ρ<0), this indicates that the roll angle φ is increasing in the right direction at the speed of |ρ|. Accordingly, when ρ<0 while φ<0 (a roll angle toward the right direction), this roll angle toward the right direction is increasing still further; and when ρ<0 while φ>0 (a roll angle toward the left direction), this roll angle φ toward the left direction is decreasing and returning toward 0.

Similarly, if the roll rate ρ is a positive value (ρ>0), this indicates that the roll angle φ is increasing in the left direction at the speed of |ρ|. Accordingly, when ρ>0 while φ>0 (a roll angle toward the left direction), the roll angle toward the left direction is increasing still further; and when ρ>0 while φ<0 (a roll angle toward the right direction), this roll angle φ toward the right direction is decreasing and returning toward 0.

Figure 4:
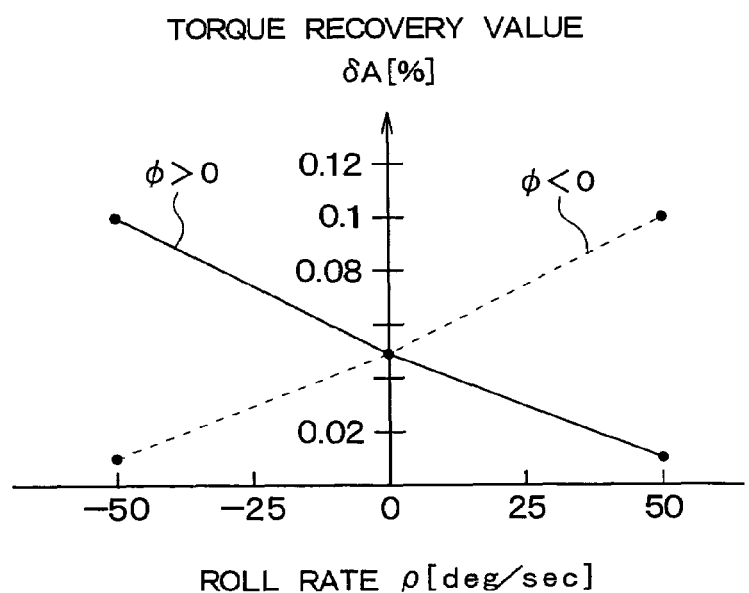
FIG. 4 is a map showing the characteristics of a torque recovery value δA with respect to a roll rate ρ.

As shown in FIG. 4, the characteristics of the torque recovery value δA (ρ) are set in the following manner. In the case that the roll angle φ>0 (a roll angle to the left direction), the torque recovery value δA (ρ) increases in accordance with increase in the magnitude of the negative roll rate ρ(<0) as shown by the solid line in FIG. 4. On the other hand, in the case that the roll angle φ<0 (a roll angle to the right side), the torque recovery value δA (ρ) increases in accordance with increase in the magnitude of the positive roll rate ρ(>0), as shown by the dashed line. Note that both the region ρ>0 in the case that φ>0 and the region φ<0 in the case that ρ<0 are set such that control of torque recovery can be smoothly executed even if the roll rate ρ changes temporarily.

As can be seen from FIG. 4, as the speed at which the roll angle φ returns to 0 (hereinafter referred to as the "zero return speed") increases, the torque recovery value δA(ρ) increases.

In the case that the zero return speed of the roll angle φ is large (namely, when the roll rate ρ has a large negative value when the roll angle φ>0, and when the roll rate ρ has a large positive value when the roll angle φ<0), vehicle behavior becomes increasingly more stable as the roll angle φ returns toward the vicinity of 0. Accordingly, in this case, even if engine output is increased early, vehicle behavior does not become abnormal. Thus, by increasing the amount by which the target engine torque value is increased to the extent that the zero return speed of the roll angle φ (or alternatively, a reduction speed thereof) increases, return to the pre-correction target engine torque value is caused to occur earlier. Therefore, the driver is less liable to be irritated by slow increase in engine torque, and it is possible to improve driving feeling.

Next, at 180, the present torque transmission rate αA (n) is corrected to a value that equals the prior torque transmission rate αA (n−1) plus the torque recovery value δA (ρ), rather than the value calculated at 140. It should be noted that, in order to make the recovery of engine output gradual, the torque recovery value δA is set so as to satisfy the relationship that it is sufficiently smaller than the deviation between the prior and present torque transmission rates αA. In other words, the torque transmission rate αA satisfies the relationship αA(n)−αA (n−1)>>δA(ρ).

Next, the routine proceeds to processing at 200, the target engine torque value TQ is calculated based on Equation 3. This corresponds to correcting the maximum engine torque value MQ, which is taken as the target engine torque value TQ, using the torque transmission rate αA.

$$TQ = MQ \times \alpha A(n) \qquad \text{EQUATION 3}$$

The target engine torque value TQ corrected in this manner is converted to a target value for a throttle opening degree at 210. Then, this target value for the throttle opening degree is transmitted to the engine ECU 10. The engine ECU 10 applies a control signal that corresponds to the target value for the throttle opening degree to the throttle actuator 11. Accordingly, the opening degree of the throttle valve is adjusted based on the control signal corresponding to the target value for the throttle opening degree that is received from the engine ECU 10, whereby the engine output is made to equal the target engine torque value TQ.

In the above described manner, with the first embodiment of the present invention, the target engine torque value TQ, which is taken as the target value for the engine output, is corrected based on multiplication of the maximum engine torque value MQ and the torque transmission rate αA. This torque transmission rate αA is set so as to become gradually smaller in accordance with increase in the magnitude of the roll angle φ. In other words, setting is executed such that the target engine torque value TQ becomes gradually smaller in accordance with increase of the roll angle φ.

Accordingly, the engine output is reduced toward a smaller value in accordance with increase in the magnitude of the roll angle φ. In other words, the torque value removed from the maximum engine torque value MQ (which is taken as the target engine torque value) is increased in accordance with the magnitude of the roll angle φ. Thus, on occasions when the engine output is being reduced in order to inhibit vehicle rollover from occurring during turning, it is possible to constrain engine output by increasing the reduction rate of the engine output in accordance with increase in the magnitude of the roll angle of the vehicle. Accordingly, since engine output is adjusted in this manner, instead of control being started up abruptly, changes in vehicle posture occur smoothly and driving feeling is not impaired by the generation of abnormal changes in vehicle behavior.

Moreover, during the process in which the magnitude of the vehicle roll angle φ becomes smaller, the torque recovery value δA is used to reduce the increase amount of the torque transmission rate αA such that it becomes smaller. Accordingly, it is possible to inhibit the engine output from increasing abruptly, and cause torque recovery to take place gradually. Thus, changes in vehicle posture occur smoothly, and driving feeling is not impaired by the generation of abnormal changes in vehicle behavior. Further, in this example, the torque recovery value δA is set so as to become larger in accordance with the zero return speed (the reduction speed) of the roll angle φ. Thus, the increase amount of the target engine torque value is increased as the reduction speed of the roll angle φ is increased. Accordingly, since recovery to the pre-correction target engine torque value occurs earlier, the driver is less liable to be irritated by slow increase in engine torque, and it is possible to improve driving feeling.

Second Embodiment

Next, a second embodiment of the present invention will be described. The anti-rollover device 1 according to the second embodiment is the same as that of the first embodiment, and is provided with the same structural members and configuration as shown in FIG. 1. Accordingly, structural members that are the same as those of the first embodiment are denoted with the same reference numerals, and an explanation thereof is omitted. Further, in the second embodiment, the lateral G and the roll rate correspond to the vehicle posture change physical quantity. However, the second embodiment differs from the first embodiment with respect to the fact that a torque transmission rate αB is determined based on the roll rate ρ.

Figure 5:
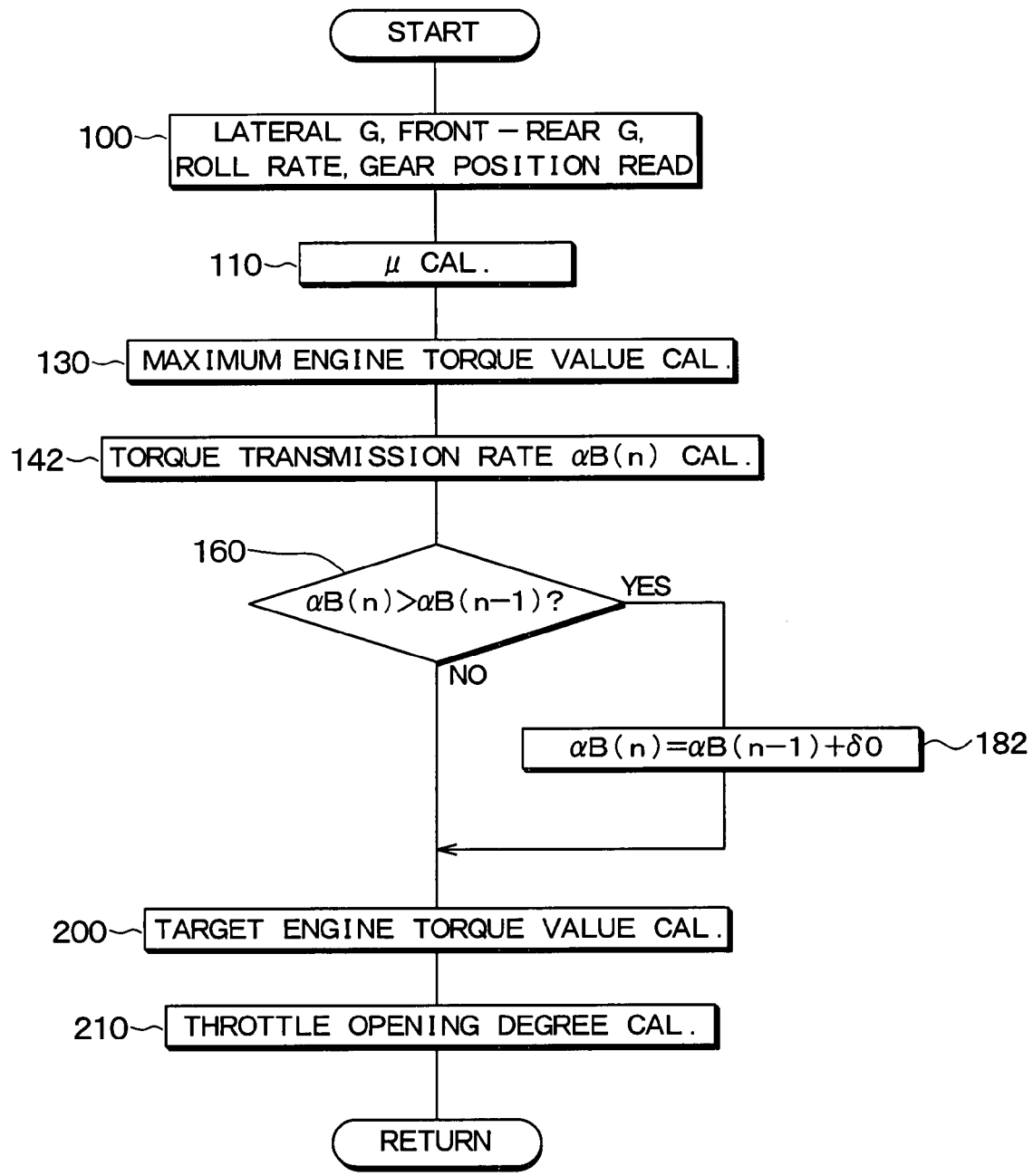
FIG. 5 is a flow chart showing a processing routine of a control program that is executed by a controller of a second embodiment of the present invention.

FIG. 5 is a flow chart showing a processing routine of a control program that is executed by the controller 2 of the second embodiment. In this flow chart, portions that execute the same processing as corresponding portions of the first embodiment are denoted with the same reference numerals. The detailed explanation of these portions is omitted here.

At 100, the information from the sensors 4, 5 and 6 is read, and then at 110, the road surface friction coefficient μ is estimated by calculation. Next, at 130, the maximum engine torque value MQ, which is taken as the pre-correction target engine torque value, is calculated based on Equation 2, described previously.

Then, at 142, the torque transmission rate αB for correcting the target engine torque value so that it becomes smaller in accordance with the roll rate ρ is calculated. This torque transmission rate αB (n) is obtained for each operation period as αB (n) for operation performance no. n. Further, the torque transmission rate αA is calculated based on (1) a pre-stored map shown in FIG. 6, described hereinafter; and (2) the roll rate ρ detected for a given operation performance no. n.

Figure 6:
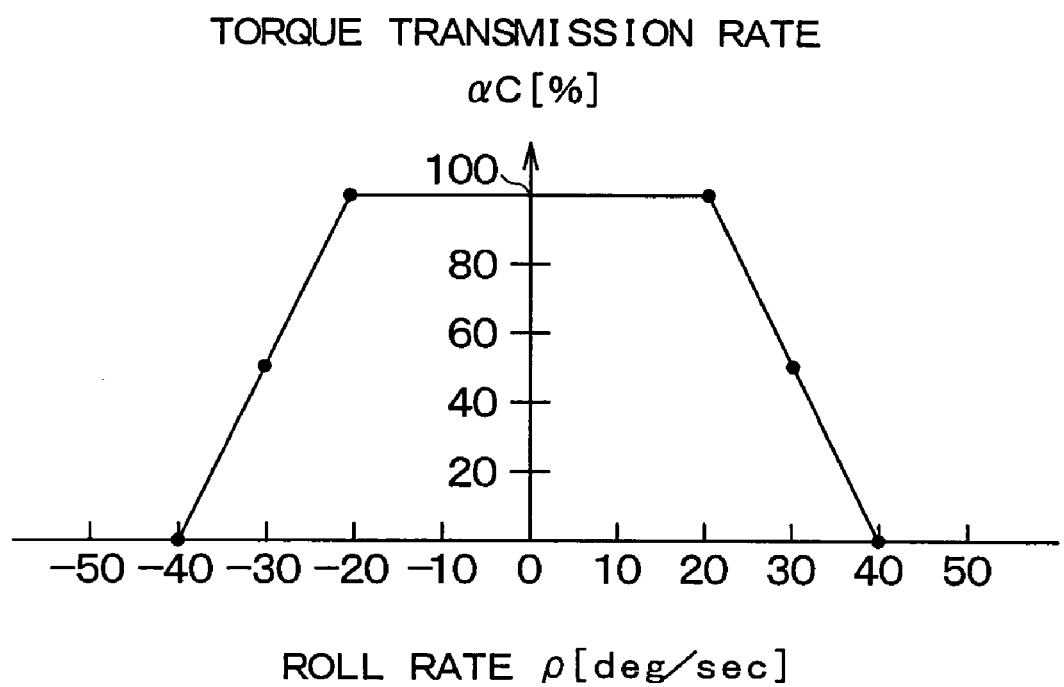
FIG. 6 is a map showing the characteristics of a torque transmission rate αB with respect to the roll rate ρ.

As can be seen from the map of FIG. 6, the torque transmission rate αB is set such that: in a range where a magnitude of the roll rate ρ, absolute value |ρ|, is comparatively small, the torque transmission rate αB is set at αB=100% so as to have a value at which the target engine torque value does not correct the maximum engine torque value MQ; in a range where the roll rate ρ has an intermediate magnitude, the torque transmission rate αB is set to decrease in accordance with increase in the magnitude of the absolute value |ρ| of the roll rate ρ; and in a range where the magnitude of the absolute value |ρ| of the roll rate ρ is large, the torque transmission rate αB is set at αB=0%.

Next, at 160, as with the first embodiment, it is determined whether the present torque transmission rate αB (n) is larger than the prior torque transmission rate αB (n−1). If the determination result is NO, the routine proceeds to processing at 200.

If the determination result at 160 is YES, the routine proceeds to processing at 182 in order to make the recovery of engine output gradual. Accordingly, the present torque transmission rate αB (n) is corrected to a value that equals the torque recovery value δ0 plus the prior torque transmission rate αB (n−1). Note that, in order to make the recovery of the engine output gradual, the torque recovery value δ0 of the second embodiment is set and applied at a constant value (for example, 0.04%) that is sufficiently smaller than the deviation between the prior and present torque transmission rates αB. In other words, the torque recovery value δ0 satisfies the relationship αB(n)−αB(n−1)>>δ0.

After the torque transmission rate αB (n) is set in this manner, as with the first embodiment, at 200, the target engine torque value TQ is corrected based on Equation 3. Then, at 210, the target engine torque value TQ is converted to a throttle opening degree, and the engine output is adjusted so as to equal the target engine torque value TQ based on this throttle opening degree.

In the above described manner, with the second embodiment, the target engine torque value TQ taken as the target value for the engine output is corrected based on multiplication of the maximum engine torque value MQ and the torque transmission rate αB. The torque transmission rate αB is set so as to become gradually smaller in accordance with increase in the magnitude of the roll rate ρ.

Accordingly, the engine output is reduced toward a smaller value in accordance with increase in the magnitude of the roll rate ρ. In other words, the torque value removed from the maximum engine torque value MQ (which is taken as the target engine torque value) is increased in accordance with the magnitude of the roll rate ρ. Thus, on occasion when the engine output is being reduced in order to inhibit vehicle rollover from occurring during turning, it is possible to constrain engine output by increasing the reduction ratio of the engine output in accordance with increase in the magnitude of the roll rate of the vehicle. Accordingly, since engine output is adjusted in this manner, instead of control being started abruptly, changes in vehicle posture occur smoothly and driving feeling is not impaired by the generation of abnormal changes in vehicle behavior.

Further, during the process in which the magnitude of the vehicle roll rate ρ becomes smaller, the increase amount of the torque transmission rate αB is reduced to a small value. Accordingly, it is possible to inhibit the engine output from increasing abruptly, and cause torque recovery to take place gradually. Thus, changes in vehicle posture occur smoothly, and driving feeling is not impaired by the generation of abnormal changes in vehicle behavior.

Third Embodiment

Figure 7:
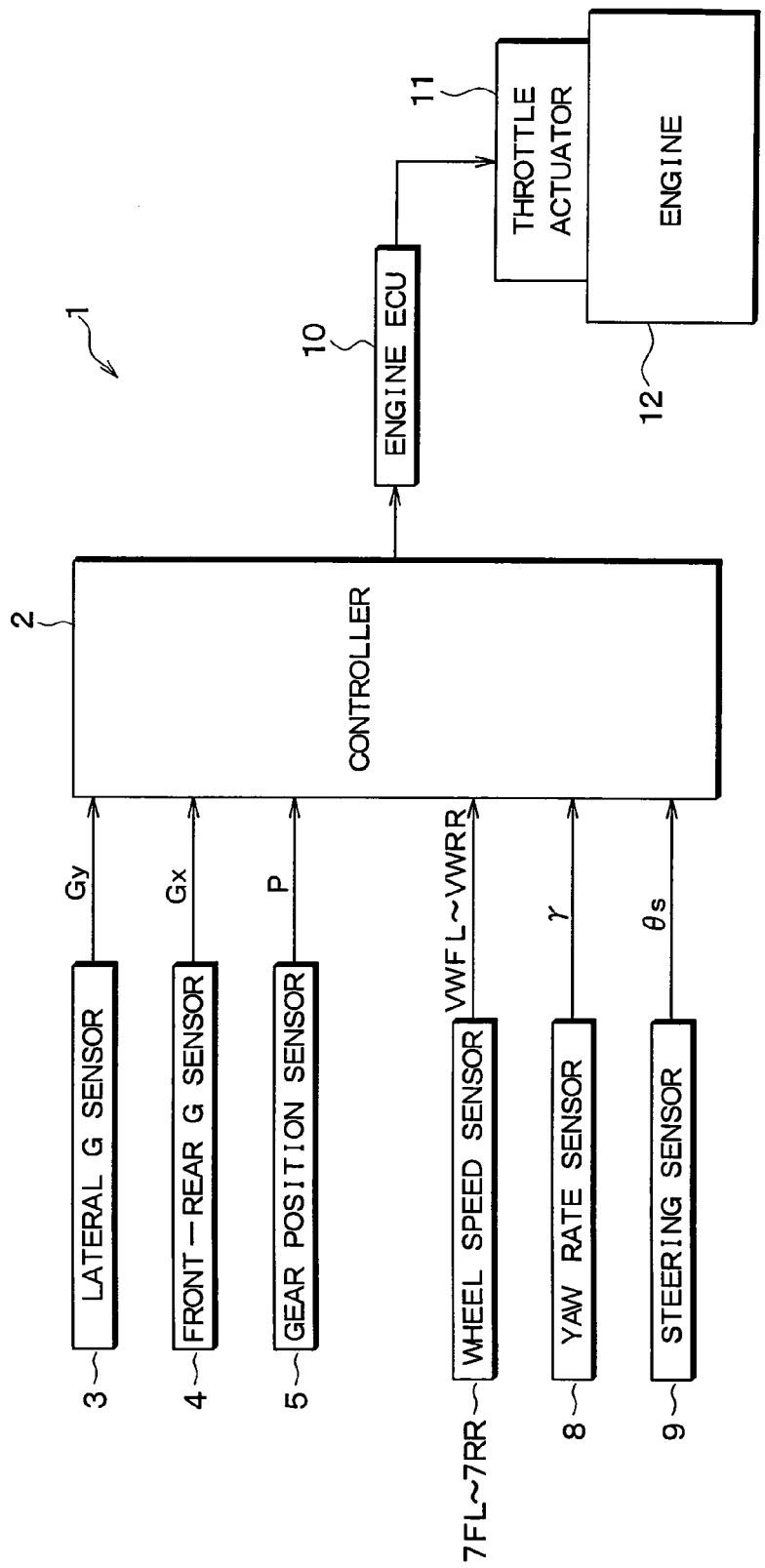
FIG. 7 is a block diagram that schematically shows the configuration of an anti-rollover device for a vehicle according to a third embodiment of the present invention.

Next, a third embodiment of the present invention will be described. FIG. 7 is a block diagram that schematically shows the configuration of the anti-rollover device 1 according to the third embodiment. It should be noted that structural members that are the same as those of the first and second embodiments are denoted with the same reference numerals, and an explanation thereof is omitted.

As can be seen from the configuration shown in FIG. 7, the anti-rollover device 1 according to the third embodiment is provided with the lateral G sensor 3, the front-rear G sensor 4, and the gear position sensor 5, like the first embodiment. However, the third embodiment differs slightly from the first embodiment with respect to the fact that it is further provided with vehicle wheel speed sensors 7FL to 7RR for each wheel; a yaw rate sensor 8; and a steering angle sensor 9. The vehicle wheel speed sensors 7FL to 7RR detect respective speeds VWFL to VWRR of vehicle wheels FL, FR, RL and RR; the yaw rate sensor 8 detects a yaw rate γ of the vehicle; and the steering angle sensor 9 detects a steering angle θs of a steering wheel (not shown). Note that the left and right wheels of the front and rear of the vehicle are denoted respectively as FL, FR, RL and RR.

The third embodiment differs from the previously described first and second embodiments in that a torque transmission rate αC is determined based on the lateral G. Note that, in the third embodiment, at least one of the lateral G and the yaw rate corresponds to the vehicle posture change physical quantity.

Figure 8:
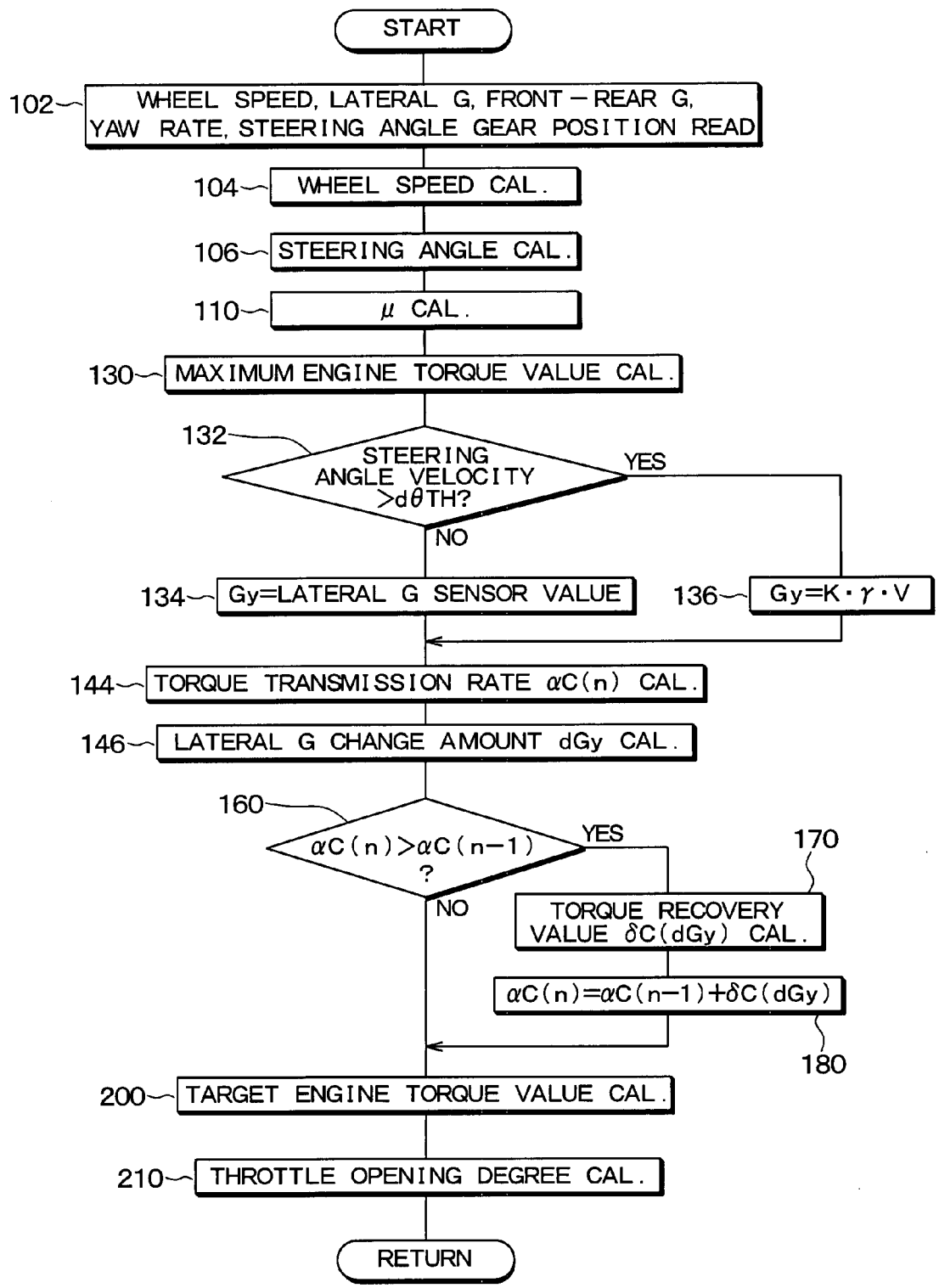
FIG. 8 is a flow chart showing a processing routine of a control program that is executed by a controller of the third embodiment.

FIG. 8 is a flow chart showing a processing routine of a control program that is executed by the controller 2 of the third embodiment. In this flow chart, portions that execute the same processing as corresponding portions of the first and second embodiments are denoted with the same reference numerals. The detailed explanation of these portions is omitted here.

First, at 102, the vehicle wheel speeds VWFL to VWRR of each wheel FL to RR are read from the vehicle wheel speed sensors 7FL to 7RR. Further, the lateral G value Gy from the lateral G sensor 3; the front-rear G value Gx from the front-rear G sensor 4; the yaw rate γ from the yaw rate sensor 8; the steering angle θs from the steering angle sensor 9; and the gear ratio P from the gear position sensor 5 are respectively read.

Next, at 104, a vehicle speed V is calculated so as to equal the maximum value among the vehicle wheel speeds VWFL to VWRR. Then, at 106, a steering angle degree dθs, which is a derivative of the steering angle θs, is calculated.

Then, at 110, in a similar manner to the above described first and second embodiments, the road surface friction coefficient μ is estimated by calculation using Equation 1 above. Following this, at 130, as with the first and second embodiments, the maximum engine torque value MQ, which is taken as the pre-correction target engine torque value, is calculated based on Equation 2 above.

Next, at 132, it is determined whether the steering angle velocity dθs is larger than a predetermined threshold value dθTH. In other words, it is determined whether or not the steering of the vehicle is changing rapidly. If the determination result is NO, the steering of the vehicle is changing comparatively slowly, and thus, at 134, the detection value from the lateral G sensor 3 is adopted as the lateral G value Gy. Alternatively, if the determination result is YES, the steering of the vehicle is changing comparatively fast, and thus, at 136, the value calculated using Equation 4 below, which is based on the yaw rate γ and the vehicle speed V, is adopted as the lateral G value Gy.

$$Gy = K \cdot \gamma \cdot V \qquad \text{EQUATION 4}$$

where, K is a constant.

At 144, the torque transmission rate αC for correcting the target engine torque value so that it becomes smaller in accordance with the lateral G value Gy is calculated. This torque transmission rate αC (n) is obtained for each operation period as αC (n) for operation performance no. n. Further, the torque transmission rate αC is calculated based on (1) a pre-stored map shown in FIG. 9, described hereinafter; and (2) the lateral G value Gy for the given operation performance no. adopted at 134, or the lateral G value Gy adopted at 136.

Figure 9:
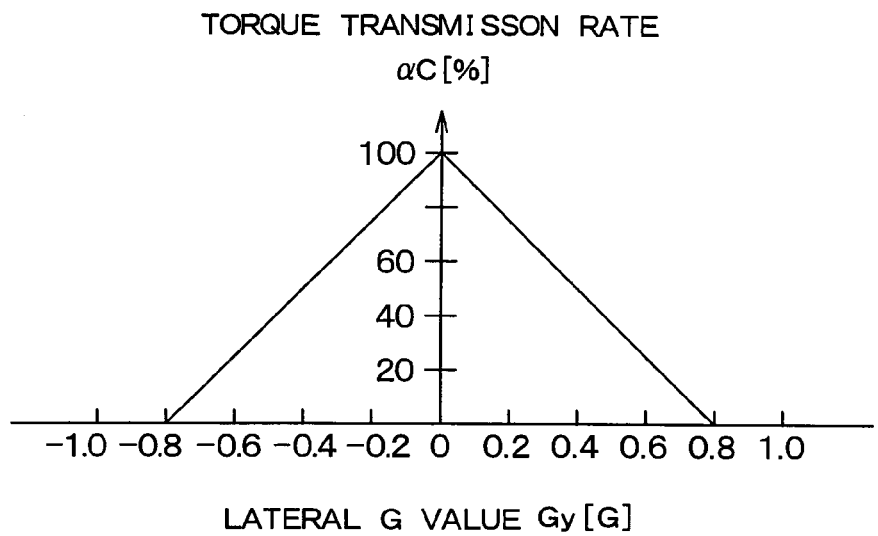
FIG. 9 is a map showing the characteristics of a torque transmission rate αC with respect to a lateral acceleration Gy.

As can be seen from the map of FIG. 9, the torque transmission rate αC is set such that: when the lateral G value Gy is 0, the torque transmission rate αC is set at αC=100%; and when the magnitude of the lateral G value Gy increases (in either the left or right direction), the torque transmission rate αC decreases in accordance therewith until a predetermined value is reached (in the example of FIG. 9, Gy=0.8G; where G is gravitational acceleration) at which the torque transmission rate αC is set at αC=0%. Accordingly, the torque transmission rate αC becomes smaller along with increase of an absolute value |Gy| of the lateral G value Gy. In other words, the reduction rate of the engine output increase such that the engine output is gradually reduced.

Next, at 146, a lateral G change amount dGy (G/sec) is calculated for each unit of time based on the value difference between the lateral G values Gy for respective operation periods.

Then, at 160, as with the first and second embodiments, it is determined whether the present torque transmission rate αC (n) is larger than the prior torque transmission rate αC (n−1). Moreover, as with the first embodiment, if the determination result is NO, the routine proceeds to processing at 200. However, if the determination result is YES, the routine proceeds to processing at 170.

As with the first embodiment, at 170, a torque recovery value δC (dGy) is calculated as a correction value for the torque transmission rate αC. This torque recovery value δC (dGy) is calculated based on the map shown in FIG. 10 and the present lateral G change amount dGy.

In this example, the relationship between the lateral G value Gy and the lateral G change amount dGy that is a derivative thereof is as follows. If the lateral G change amount dGy is a negative value, this indicates that the lateral G value Gy (<0) is increasing still further when the lateral G is acting toward the right; alternatively a negative value indicates that this lateral G value (>0) is reducing toward 0 when the lateral G is acting toward the left. Similarly, if the lateral G change amount dGy is a positive value, this indicates that the lateral G value (>0) is increasing still further, when the lateral G is acting toward the left; alternatively a positive value indicates that this lateral G value (<0) is reducing toward 0 when the lateral G is acting toward the right. Further, the speed of the increase or the decrease of the lateral G value Gy indicates the magnitude of the lateral G change amount dGy (the absolute value |dGy|).

Figure 10:
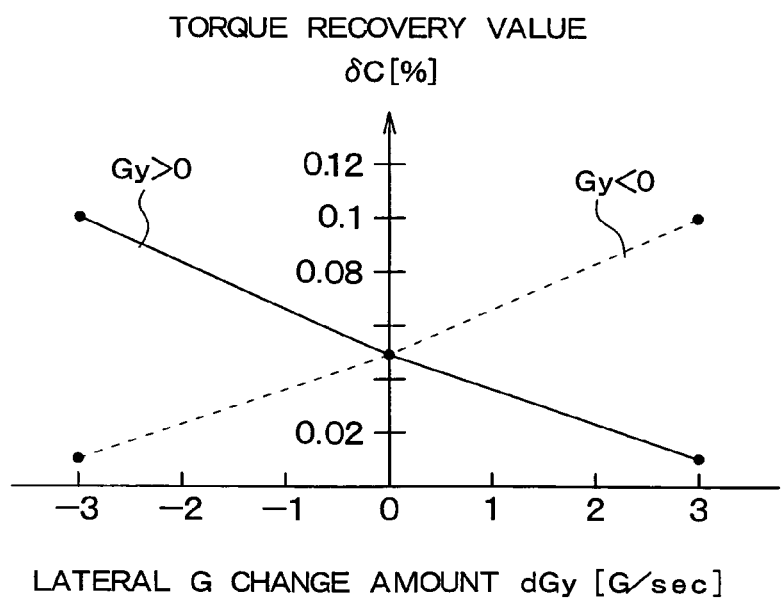
FIG. 10 is a map showing the characteristics of a torque recovery value δC with respect to a lateral acceleration change amount dGy.

As can be seen from FIG. 10, the torque recovery value δC (dGy) is set to increase in accordance with the increase in the magnitude |dGy| of the negative lateral G change amount dGy (<0) when the lateral G value Gy is >0 (the lateral G is acting to the left). In other words, the torque recovery value δC (dGy) is set to increase in accordance with increase in the reduction speed toward 0 of leftward-acting lateral G (refer to the solid line in FIG. 10). Similarly, the torque recovery value δC (dGy) is set so as to increase in accordance with the increase in the magnitude |dGy| of the positive lateral G change amount dGy (>0) when the lateral G value Gy is <0 (the lateral G is acting to the right). In other words, the torque recovery value δC (dGy) is set to increase in accordance with increase in the reduction speed toward 0 of rightward-acting lateral G (refer to the dashed line in FIG. 10). It should be noted that, in FIG. 10, both the region where dGy>0 in the case that Gy>0 and the region where dGy<0 in the case that Gy<0 are set such that control of torque recovery can be executed smoothly even if the lateral G change amount dGy changes temporarily.

As can be seen from FIG. 10, as the zero return speed of the lateral G value Gy (or the reduction speed thereof) increases, the torque transmission rate αC (dGy) increases.

In the case that the zero return speed of the lateral G is large (namely, when the lateral G change amount dGy has a large negative value when the lateral G value Gy>0; and when the lateral G change amount dGy has a large positive value when the lateral G value Gy<0), vehicle behavior becomes increasingly more stable as the lateral G value Gy returns toward the vicinity of 0. Accordingly, in this case, even if engine output is increased early, vehicle behavior does not become abnormal. Thus, by increasing the increase amount of the target engine torque value to the extent that the zero return speed of the lateral G value Gy (or, alternatively, the reduction speed thereof) increases, return to the pre-correction target engine torque value is caused to occur earlier. Therefore, the driver is less liable to be irritated by slow increase in engine torque, and it is possible to improve driving feeling.

Next, at 180, as with the first embodiment, the present torque transmission rate αC (n) is corrected to a value that equals the prior torque transmission rate αC (n−1) plus the torque recovery value δC (dGy). At this time, in order to make the recovery of the engine output gradual, the torque recovery value δC (dGy) is set so as to satisfy the relationship that it is sufficiently smaller than the deviation between the prior and present torque transmission rates αC. In other words, the torque transmission rate αC satisfies the relationship αC (n)−αC(n−1)>>δC (dGy).

Next, in a similar manner to the first and second embodiments, at 200, the target engine torque value TQ is calculated based on Equation 2 above using the torque transmission rate αC (n). Then, at 210, this target engine torque value TQ is converted to a throttle opening degree, and adjustment is executed such that the engine output becomes equal to the target engine torque value TQ.

In the above described manner, with the third embodiment of the present invention, the target engine torque value TQ, which is taken as the target value for the engine output, is corrected based on multiplication of the maximum engine torque value MQ and the torque transmission rate αC. This torque transmission rate αC is set so as to become gradually smaller in accordance with increase in the magnitude of the lateral G value Gy. In other words, setting is executed such that the target engine torque value TQ becomes gradually smaller in accordance with increase of the lateral G value Gy.

Accordingly, the engine output is reduced toward a smaller value in accordance with increase in the magnitude of the lateral G value Gy. In other words, the torque value removed from the maximum engine torque value MQ (which is taken as the target engine torque value) is increased in accordance with the magnitude of the lateral G value Gy. Thus, on occasions when the engine output is being reduced in order to inhibit vehicle rollover from occurring during turning, it is possible to constrain engine output by increasing the reduction rate of the engine output in accordance with increase in the magnitude of the lateral G of the vehicle. Accordingly; since engine output is adjusted in this manner, instead of control being started up abruptly, changes in vehicle posture occur smoothly and driving feeling is not impaired by the generation of abnormal changes in vehicle behavior.

Moreover, during the process in which the magnitude of the vehicle lateral G becomes smaller, the torque recovery value $\delta C$ is used to reduce the increase amount of the torque transmission rate $\alpha C$ such that it becomes smaller. Accordingly, it is possible to inhibit the engine output from increasing abruptly, and cause torque recovery to take place gradually. Thus, changes in vehicle posture occur smoothly, and driving feeling is not impaired by the generation of abnormal changes in vehicle behavior. Further, in this example, the torque recovery value $\delta C$ is set so as to become larger in accordance with the zero return speed (the reduction speed) of the lateral G. Thus, the increase amount of the target engine torque value is increased as the reduction speed of the lateral G value Gy is increased. Accordingly, since recovery to the pre-correction target engine torque value occurs earlier, the driver is less liable to be irritated by slow increase in engine torque, and it is possible to improve driving feeling.

Other Embodiments

The above described embodiments give examples in which the engine control ECU 10, as an engine control portion, drives the throttle actuator 11. However, an electronic governor may be controlled instead of the throttle actuator 11. If such an electronic governor is used, it is possible to adjust the output of a diesel engine.

While the above description is of the preferred embodiments of the present invention, it should be appreciated that the invention may be modified, altered, or varied without deviating from the scope and fair meaning of the following claims.

What is claimed is:

1. An anti-rollover device for a vehicle, comprising:
a vehicle posture change physical quantity detection portion for detecting a vehicle posture change physical quantity that indicates a change in vehicle posture in a lateral direction of the vehicle;
a torque transmission rate calculation portion for calculating a torque transmission rate for an engine output of an engine provided in the vehicle such that the torque transmission rate becomes smaller in accordance with increase in a magnitude of the vehicle posture change physical quantity;
a target engine torque value calculation portion for calculating a target engine torque value to be used as a target value for the engine output;
a target engine torque value correction portion for correcting the target engine torque value based on the torque transmission rate; and
an engine control unit for controlling the engine output based on the corrected target engine torque value.

2. The anti-rollover device for a vehicle according to claim 1, wherein
the target engine torque value calculation portion calculates, as the target engine torque value, a maximum engine torque value that indicates a maximum engine output that can be transmitted to a road surface while grip of a drive wheel of the vehicle is maintained.

3. The anti-rollover device for a vehicle according to claim 2, further comprising:
a coefficient detection portion for detecting a road surface friction coefficient; and
a gear ratio detection portion for detecting a gear ratio of a transmission provided in the vehicle, wherein
the target engine torque value calculation portion calculates the maximum engine torque value based on the road surface friction coefficient and the gear ratio of the transmission.

4. The anti-rollover device for a vehicle according to claim 3, wherein the coefficient detection portion calculates the road surface friction coefficient based on an acceleration of the vehicle.

5. The anti-rollover device for a vehicle according to claim 1, wherein
the vehicle posture change physical quantity detection portion detects a roll angle of the vehicle, and
the torque transmission rate calculation portion calculates the torque transmission rate such that the torque transmission rate becomes smaller as a magnitude of the roll angle increases.

6. The anti-rollover device for a vehicle according to claim 5, wherein the target engine torque value correction portion sets a change amount of the torque transmission rate, when the torque transmission rate is being changed by an increase amount that corresponds with a change in the roll angle, to a torque recovery value that is smaller than the increase amount.

7. The anti-rollover device for a vehicle according to claim 6, wherein the torque recovery value is set to be larger in accordance with increase in a magnitude of a roll rate in a direction that decreases the roll angle.

8. The anti-rollover device for a vehicle according to claim 1, wherein
the vehicle posture change physical quantity detection portion detects a roll rate of the vehicle, and
the torque transmission rate calculation portion calculates the torque transmission rate such that the torque transmission rate becomes smaller in accordance with increase in a magnitude of the roll rate.

9. The anti-rollover device for a vehicle according to claim 8, wherein
the target engine torque value correction portion sets a change amount of the torque transmission rate, when the torque transmission rate is being changed by an increase amount that corresponds with a change in the roll rate, to a torque recovery value that is smaller than the increase amount.

10. The anti-rollover device for a vehicle according to claim 1, wherein
the vehicle posture change physical quantity detection portion detects a lateral acceleration of the vehicle, and
the torque transmission rate calculation portion calculates the torque transmission rate such that the torque transmission rate becomes smaller in accordance with increase in a magnitude of the lateral acceleration.

11. The anti-rollover device for a vehicle according to claim 10, wherein the torque transmission rate calculation portion calculates, when a steering angular velocity is larger than a predetermined value, the torque transmission rate in accordance with a lateral acceleration value that is calculated based on a detection value of a yaw rate sensor.

12. The anti-rollover device for a vehicle according to claim 10, wherein the target engine torque value correction portion sets a change amount of the torque transmission rate, when the torque transmission rate is being changed by an increase amount that corresponds with a change in the magnitude of the lateral acceleration, to a torque recovery value that is smaller than the increase amount.

13. The anti-rollover device for a vehicle according to claim 12, wherein the torque recovery value is set to a larger value in accordance with increase in a magnitude of a lateral acceleration change amount in a direction in which the lateral acceleration decreases.

14. The anti-rollover device for a vehicle according to claim 1, wherein the vehicle posture change physical amount detection portion detects, at least one of a roll angle, a roll rate, and a lateral acceleration of the vehicle.

* * * * *